(12) United States Patent
Marcus et al.

(10) Patent No.: US 8,440,933 B2
(45) Date of Patent: May 14, 2013

(54) SYSTEMS AND METHODS FOR ENHANCED CONTROL OF LASER DRILLING PROCESSES

(75) Inventors: Harris L. Marcus, Storrs, CT (US); Robin Bright, Fiskdale, MA (US)

(73) Assignee: University of Connecticut, Farmington, CT (US)

( * ) Notice: Subject to any disclaimer, the term of this patent is extended or adjusted under 35 U.S.C. 154(b) by 272 days.

(21) Appl. No.: 12/761,868

(22) Filed: Apr. 16, 2010

(65) Prior Publication Data

US 2011/0017715 A1    Jan. 27, 2011

Related U.S. Application Data

(60) Provisional application No. 61/212,983, filed on Apr. 17, 2009.

(51) Int. Cl.
  *B23K 26/00*    (2006.01)
(52) U.S. Cl.
  USPC ............... 219/121.71; 219/121.7; 219/121.62
(58) Field of Classification Search ............. 219/121.61, 219/121.62, 121.64, 121.7, 121.71, 121.72
  See application file for complete search history.

(56) References Cited

U.S. PATENT DOCUMENTS

| | | | |
|---|---|---|---|
| 4,540,727 A | 9/1985 | Vogdes | |
| 5,026,964 A | 6/1991 | Somers et al. | |
| 5,026,979 A * | 6/1991 | Ortiz et al. | 250/205 |
| 5,045,669 A | 9/1991 | Ortiz, Jr. et al. | |
| 5,695,660 A | 12/1997 | Litvak | |
| 6,054,673 A | 4/2000 | Chen | |
| 6,060,685 A | 5/2000 | Chou et al. | |
| 6,140,604 A | 10/2000 | Somers et al. | |
| 6,723,953 B2 | 4/2004 | Aleshin | |
| 6,762,835 B2 | 7/2004 | Zhang et al. | |
| 7,440,097 B2 * | 10/2008 | Benicewicz et al. | 356/316 |
| 8,164,022 B2 * | 4/2012 | Mazumder et al. | 219/121.64 |
| 2005/0061779 A1 | 3/2005 | Blumenfeld et al. | |
| 2006/0237406 A1 | 10/2006 | Schmidt-Sandte et al. | |
| 2007/0296968 A1 | 12/2007 | Wu et al. | |

OTHER PUBLICATIONS

Duffey, et al., Spatially and Temporally Resolved Temperature Measurements of Plasma Generated in Percussion Drilling With A Diode-Pumped NdYAG Laser, J. of Applied Physics, vol. 84, No. 8, p. 4122.

(Continued)

*Primary Examiner* — Kevin M Picardat
(74) *Attorney, Agent, or Firm* — McCarter & English, LLP

(57) ABSTRACT

Systems and methods are provided for monitoring and/or controlling laser drilling processes based on atomic emission spectral emissions that are collected in real time during laser drilling. The systems and methods may be used to monitor and control laser drilling operations across a range of materials, e.g., metals (including alloys) and ceramics, and may be used to identify spectral characteristics that signify hole completion and to manage/discontinue laser drilling operations based thereon. The ability to precisely monitor for hole completion provides the important advantage of reducing unnecessary laser pulses, which otherwise could reduce manufacturing efficiency and/or increase thermal or mechanical damage to the component material. The systems and methods may also be employed to control laser drilling operations so as to enhance hole quality and/or to implement corrective action when/if necessary to ensure that laser drilling operations yield high quality drilled holes.

18 Claims, 18 Drawing Sheets

OTHER PUBLICATIONS

Amoruso et al., Characterization of Laser-Ablation Plasmas, J. Phys. B: At. Mol. Opt. Phys, 32, 1999, R131-R172.

Sun et al., Micromachining of Vias Through Thermal-Sprayed Multilayer Structures Using Ultrafast Lasers, Proceedings of 2001 ASME International Mechanical Engineering Congress and Exposition, Nov. 11-16, 2001, New York, NY, pp. 1-7.

Tong, et al., Real-Time Control of Ultrafast Laser Micromachining by Laser-Induced Breakdown Spectroscopy, Applied Optics, vol. 43, No. 9, 2004, pp. 1971-1980.

Szymanski et al., The Spectroscopy of the Plasma Plume Induced During Laser Welding of Stainless Steel, J. Phys. D. Appl. Phys. No. 40, 2007, p. 5917.

Lober, et al., Spectroscopic Diagnosis of Plasma During Laser Processing of Aluminum, J. Phys. D: Appl. Phys. No. 40, 2007, p. 5917.

Das, et al., Depth-Profiling Study of a Thermal Barrier Coated Superalloy Using Femtosecond Laser-Induced Breakdown Spectroscopy, Spectrochimica Acta Part B 63, 2008, pp. 27-36.

* cited by examiner

SYSTEMS AND METHODS FOR ENHANCED CONTROL OF LASER DRILLING PROCESSES

CROSS REFERENCE TO RELATED APPLICATION(S)

The present application claims the benefit of a provisional patent application entitled "Method of Process Monitoring for Laser Drilling," which was filed on Apr. 17, 2009, and assigned Ser. No. 61/212,983. The entire contents of the foregoing provisional patent application are incorporated herein by reference.

STATEMENT OF GOVERNMENT SUPPORT

This invention was made with support from the United States Government under a subcontract under AFOSR Grant # FA 9550-06-1-0397. The U.S. Government has certain rights in the invention.

FIELD OF INVENTION

The present invention relates to the field of laser processing of materials and, more specifically, to the field of process monitoring and control for laser drilling of materials, e.g., metals and ceramics. More particularly, the present disclosure provides advantageous systems and methods for measuring, correlating and acting upon data/information obtained in connection with laser drilling processes (e.g., by emission spectroscopy) for system control, process management and the like.

BACKGROUND

The ability to adequately cool internal gas turbine engine components in next-generation commercial and military aircraft is of extreme importance to the aerospace industry as the demand for higher efficiency designs is constantly pushing engine operating temperatures higher. Advancements in cooling technology have allowed engines to run at increasingly high temperatures without a significant degradation of the structural properties of the component materials and recent developments continue to push the limits of material performance. Many of these developments involve precise control of the number, size, shape and location of small cooling holes on the surface of specific high temperature components, including blades, vanes, disks and compressor liners.

Laser-based machining processes such as cutting, welding and drilling are used in a variety of industries. In particular, the aerospace and land-based power generation industries rely heavily on laser processing of materials, e.g., for production of turbine engine components. Specifically, the use of lasers to drill small cooling holes in metallic and non-metallic components has dramatically increased in recent history and will continue as newer designs require more advanced cooling techniques in terms of the number, size, shape and precision of such cooling holes.

Pulsed laser drilling is used in creating cooling holes in high temperature engine components due to the potential for improved processing speed and positional accuracy as compared to conventional drilling techniques. In addition, recent advances in laser systems technology have enabled the creation of cooling holes of complex geometries that have improved airflow characteristics over conventional cylindrical holes. The trend towards higher efficiency engines coupled with new developments in laser system technologies is responsible, at least in part, for the increase in the number of cooling holes per engine, e.g., from 100,000 to more than 750,000 in proposed designs. As the production demand for laser-drilled cooling holes continues to grow, efficient and reliable process control techniques are needed in order to achieve the necessary manufacturing efficiency while ensuring quality conformance.

Efforts have been made to advance laser drilling technology, including specifically the potential collection and use of information of relevance and/or value in connection with laser drilling processes and related control systems. Thus, for example, the patent literature includes the following disclosures of relevance to laser drilling processes and/or related control systems:

1. Laser ablation feedback spectroscopy—US Published Patent App'n. # 20050061779
2. Method for securing a drilling process—US Published Patent App'n. # 20060237406
3. Method and apparatus for laser drilling—U.S. Pat. No. 6,054,673
4. Laser drilling system utilizing photoacoustic feedback—U.S. Pat. No. 4,504,727
5. Optical breakthrough sensor for laser drill—U.S. Pat. No. 5,026,964
6. Laser beam stop sensor and method for automatically detecting the presence of laser beam stop material using a laser beam stop sensor—U.S. Pat. No. 6,723,953
7. Fiber optic laser-induced breakdown spectroscopy sensor for molten material analysis—U.S. Pat. No. 6,762,835
8. Method for monitoring laser weld quality—U.S. Pat. No. 6,060,685
9. Method and apparatus for optically/acoustically monitoring laser materials processing—U.S. Pat. No. 5,045,669
10. Laser drilling breakthrough detector—U.S. Pat. No. 6,140,604

Beyond the patent literature, the technical literature also includes teachings of relevance to laser drilling processes and/or related control systems, including:

1. Amoruso et. al, "*Characterization of laser-ablation plasmas*", J. Phys. B: At. Mol. Opt. Phys, 32 (1999), R131-R172.
2. Szymanski et. al., "The spectroscopy of the plasma plume induced during laser welding of stainless steel", J. Phys. D: Appl. Phys. No. 30 (1997) 3153.
3. Lober and Mazumder, "*Spectroscopic diagnosis of plasma during laser processing of aluminum*", J. Phys. D: Appl. Phys. No. 40 (2007), p. 5917.
4. Duffey and Mazumder, "*Spatially and temporally resolved temperature measurements of plasma generated in percussion drilling with a diode-pumped Nd:YAG laser*", J. of Applied Physics, Vol. 84, No. 8, 4122.

Despite efforts to date, there is an unmet need for precise methods for process monitoring and process control for use in laser processing of materials. For example, due to technological limitations, hole completion and/or breakthrough is/are frequently detected and determined by trial-and-error. Alternatively, breakthrough may be detected and/or determined by a photodetector that is placed behind the workpiece being drilled. When the laser-drilled hole achieves full penetration through a component, the photodetector detects the "breakthrough" of the laser beam and calls for the next hole to be drilled. In addition, breakthrough detectors that are based on acoustic signatures originating during laser-material interaction are known. Other available breakthrough detection methods, which utilize the detection of radiation being emitted from the laser-material interaction zone, may be applicable to workpieces of complex or hollow geometries, where conventional breakthrough detectors cannot be used.

However, there are several shortcomings to the currently available methods for monitoring hole completion. For example, breakthrough detection by means of a photodetector requires that the workpiece material be single walled. Furthermore, such methods are not applicable to detecting breakthrough on components that are hollow where it is desired that only one wall be drilled. Hollow components are typically filled with a wax or wax-like material that absorbs the laser beam and protects against back-wall strike, which necessitates that the wax material be removed after completion of hole drilling.

Thus, despite efforts to date, a need remains for systems and methods that facilitate efficient and effective laser drilling processes. These and other needs are met according to the systems and methods of the present disclosure.

SUMMARY

The present invention provides advantageous systems and methods for monitoring and control of system parameters/operations in connection with laser drilling processes. Exemplary systems and methods of the present disclosure utilize the detection of atomic emissions generated during laser drilling and subsequent analysis of spectral features, e.g., the calculation of electron temperature, to monitor and/or control laser drilling processes.

In exemplary embodiments of the present disclosure, the disclosed systems and methods provide process monitoring and/or control functionality that operates in real-time based on atomic emission spectral characteristics that occur during laser drilling of materials in order to control processing conditions and/or hole completion/quality. For example, the disclosed systems and methods are effective in detecting emissions associated with a laser drilling operation in real time, e.g., in immediate response to a laser pulse, processing such emission information to identify potential action steps to be taken with respect to such laser drilling operation, and effectuating/implementing such action steps (if any) prior to the next laser pulse.

In a further exemplary embodiment, the disclosed systems and methods are used to monitor and control laser drilling operations so as to identify spectral characteristics that signify hole completion and to manage/discontinue laser drilling operations based thereon. Of note, the ability to precisely monitor for hole completion provides the important advantage of reducing unnecessary laser pulses, which otherwise could reduce manufacturing efficiency and/or increase thermal or mechanical damage to the component material.

The systems and methods of the present disclosure take advantage of the fact that, when a small volume of a solid (e.g., metallic or ceramic) interacts with a high energy pulsed laser, as in industrial laser drilling, the free electrons in the material absorb the laser energy and transfer this energy to the lattice within picoseconds. This energy excites the atoms that make up the lattice, causing the material to melt and vaporize, resulting in material removal and a drilled hole. The remaining energy is distributed in the form of kinetic energy of the ejected plume, additional absorption and/or dissipated in the form of heat or sound. The subsequent decay from excited energy levels in the vapor back to the ground state produces photon emissions with a wavelength associated with the transition between energy levels of the specific element involved. It is known that vapor within laser-induced plumes typically consists of excited or ground-state neutral atoms, electrons and ions, and also that simple molecules can form toward the end of the plume lifetime due to atomic recombination. Small solid or liquid particles are also commonly present within a plume.

In an exemplary embodiment, the systems and methods of the present disclosure take advantage of the above-noted phenomena to provide unique capabilities, e.g., for quality control monitoring and responsive action during laser drilling, by providing systems/methods to monitor the elementally determined electron temperature of the vapor/plasma as a function of laser drilling parameters and to monitor the correlation between this electron temperature and drilled hole quality. In addition, exemplary embodiments of the present disclosure may function, at least in part, to monitor the ratio of emission intensities associated with various constituents and/or elements relative to laser drilling parameters, monitor the correlation between these emission intensity ratios and drilled hole quality, and control laser drilling operations based thereon.

Test results have demonstrated that the disclosed systems and methods are effective in producing reliable and reproducible correlative results based on spectral data/information obtained using atomic emission spectroscopy that is effectively related to various processing conditions and laser parameters, and that enables effective control thereof. In particular, the spectral data/information that may be used for such process control purposes includes: emission wavelength, emission line intensities, ratios of line intensities, and ratios of line intensities to the intensity of the primary laser beam reflection (e.g., at 1.06 μm). Electron temperature, which can be calculated from accurately measured relative line intensities, may also be reproducibly correlated to laser parameters and final hole quality according to the disclosed systems and methods.

In exemplary embodiments, the systems and methods of the present disclosure thus advantageously provide capabilities and/or functionalities that may be employed to determine breakthrough without the need for and/or limitations of a photodetector. In this way, the disclosed systems/methods avoid and/or minimize the potential for thermal/mechanical damage of the workpiece that may result from excessive laser drilling, such as in workpieces having double walled structures. The disclosed systems and methods offer significant benefits to a wide range of industries and over a variety of laser drilling applications, e.g., uses/applications in the aerospace and power generation industries which manufacture components containing a large number of cooling holes that are created by laser drilling and where the quality of these holes is of particular importance. By way of illustration, the disclosed systems/methods offer important advantages to companies and organizations that manufacture, for example, high temperature gas-turbine engine components for aerospace and land-based power generation applications, and their supply chain members. The disclosed systems/methods are not limited by or to laser drilling operations associated with specific materials, but instead can be advantageously employed across a range of metallic and ceramic material-based workpieces. Indeed, the present disclosure offers processing advantages to laser drilling applications wherein increased manufacturing efficiency is desired based on enhanced process control capabilities/functionalities.

The many benefits, advantages and applications of the disclosed systems and methods will be apparent to persons skilled in the art from the detailed description which follows, particularly when read in conjunction with the appended figures.

BRIEF DESCRIPTION OF THE FIGURES

To assist those of ordinary skill in the art in making and using the systems and methods of the present disclosure, reference is made to the accompanying figures, wherein.

DESCRIPTION OF EXEMPLARY EMBODIMENT(S)

Figure 1:
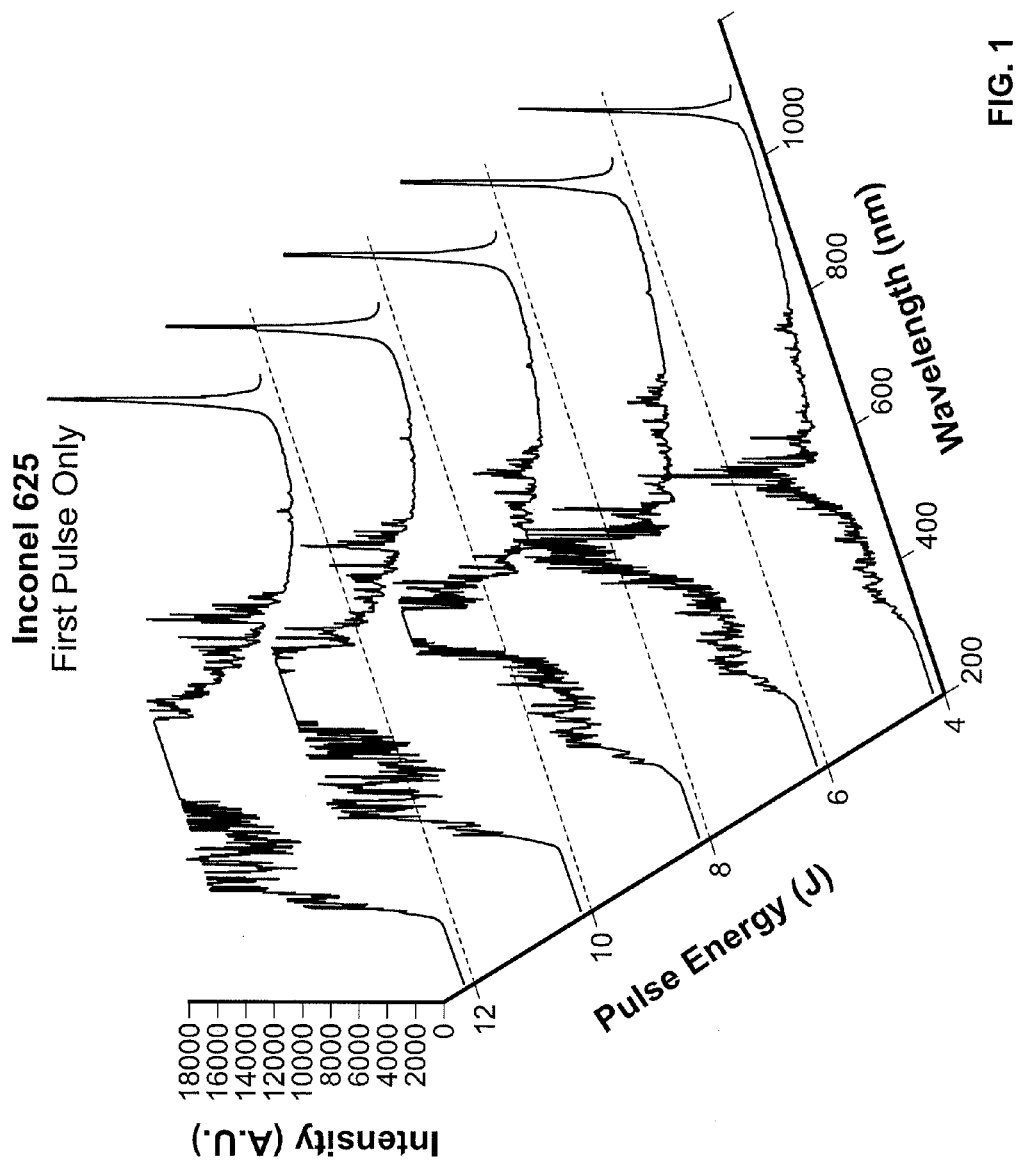
FIG. 1 is a plot of raw emission spectra over a range of pulse energies (first pulse only) for Inconel 625.

The present disclosure provides advantageous systems and methods for monitoring process parameters associated with laser drilling applications and using such process parameters to control, in whole or in part, laser processing operations. In particular, the disclosed systems and methods may be used to deliver process control capabilities/functionalities to laser drilling operations where cooling holes are being formed. In exemplary embodiments of the present disclosure, the disclosed systems and methods function to detect and/or identify if/when the laser drilling process is out of tolerance by detecting when the spectral emission signal associated with a specific constituent/element (or combination of constituents/elements) is not within a specific/predetermined range. In further exemplary embodiments, the disclosed systems and methods can detect and/or identify if/when a laser drilling process is out of tolerance by detecting when the ratio(s) of spectral emissions for one or more specific constituents/elements is not within a specific/predetermined range. Thus, for example, the disclosed systems and methods advantageously operate to detect and/or identify if/when a laser drilling process is out of tolerance based on electron temperature measurements—that are calculated from spectral line intensities—that fall outside a specific/predetermined range.

In further exemplary embodiments, the disclosed systems and methods function to monitor spectral emissions/properties during laser drilling operations that can be used, at least in part, to detect hole breakthrough. Indeed, the disclosed systems/methods may use one or more of the following parameters as a sensitive indicator of hole breakthrough: (i) hole breakthrough is determined when the spectral emission from one or more specific constituents/elements is a very small/predetermined value, e.g., falls below a predetermined value, and/or (ii) hole breakthrough is determined when the ratio of the spectral emission of a specific constituent/element relative to the spectral emission at the 1.06 µm wavelength is below a certain predetermined level.

The disclosed systems and methods may be used for process monitoring and/or control of laser drilling operations of materials that include a variety of different alloy systems and compositions, ceramics and the like. As is known by persons skilled in the art, the spectral and other characteristics of vapor plumes used for process monitoring vary with the chemistry of the different alloys. Of note, a publicly available database maintained by the National Institute of Standards and Technology (NIST) on atomic emission characteristics by constituent/element may be used to identify and analyze spectral features according to the present disclosure and based on the principles disclosed herein. The noted database is available at http://physics.nist.gov/PhysRefData/content-s.html. However, the present disclosure is neither limited by or to use of the spectral data set forth at the noted database. Rather, the spectral data contained in the noted database may be used in implementing embodiments of the present disclosure, as will be apparent to persons of ordinary skill in the art.

In further exemplary embodiments of the present disclosure, the disclosed systems and methods may be operated so as to select and/or control the timing of spectral acquisition with respect to the duration and/or other characteristics of the laser pulses used for drilling operations. Still further, the disclosed systems and methods may function to select and/or control specific locations for spectral acquisition within the vapor plume. Such location(s) may be selected, for example, so as to be at a desired location and/or distance from drilling location and/or the workpiece.

According to the present disclosure, it has been shown that the atomic emission that occurs during industrial laser drilling can be detected by spectroscopic approaches for a wide range of laser pulse conditions and workpiece materials. Exemplary test results reflecting such spectroscopic detections are provided in FIGS. 1-3.

Figure 2:
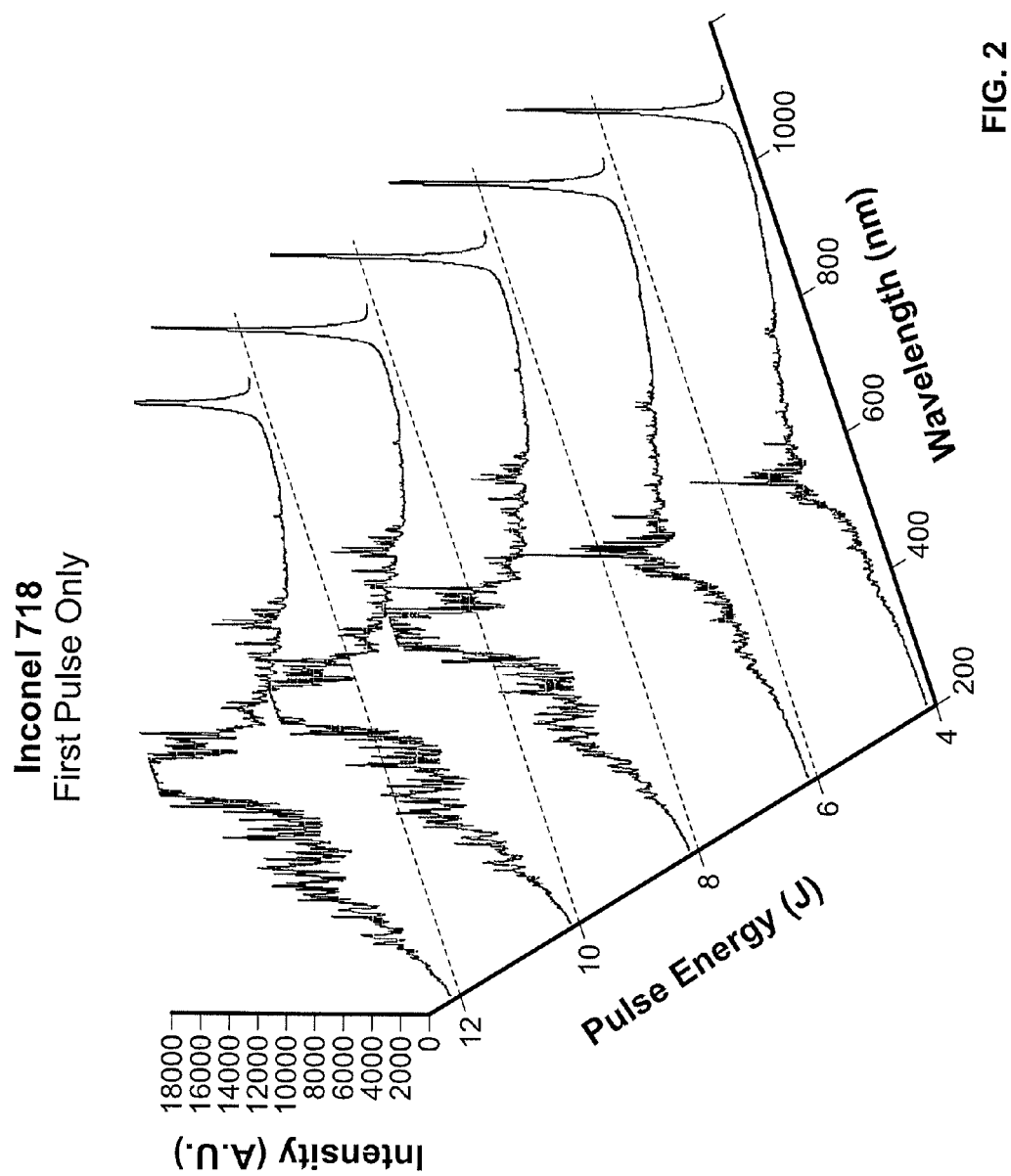
FIG. 2 is a plot of raw emission spectra over a range of pulse energies (first pulse only) for Inconel 718.
Figure 3:
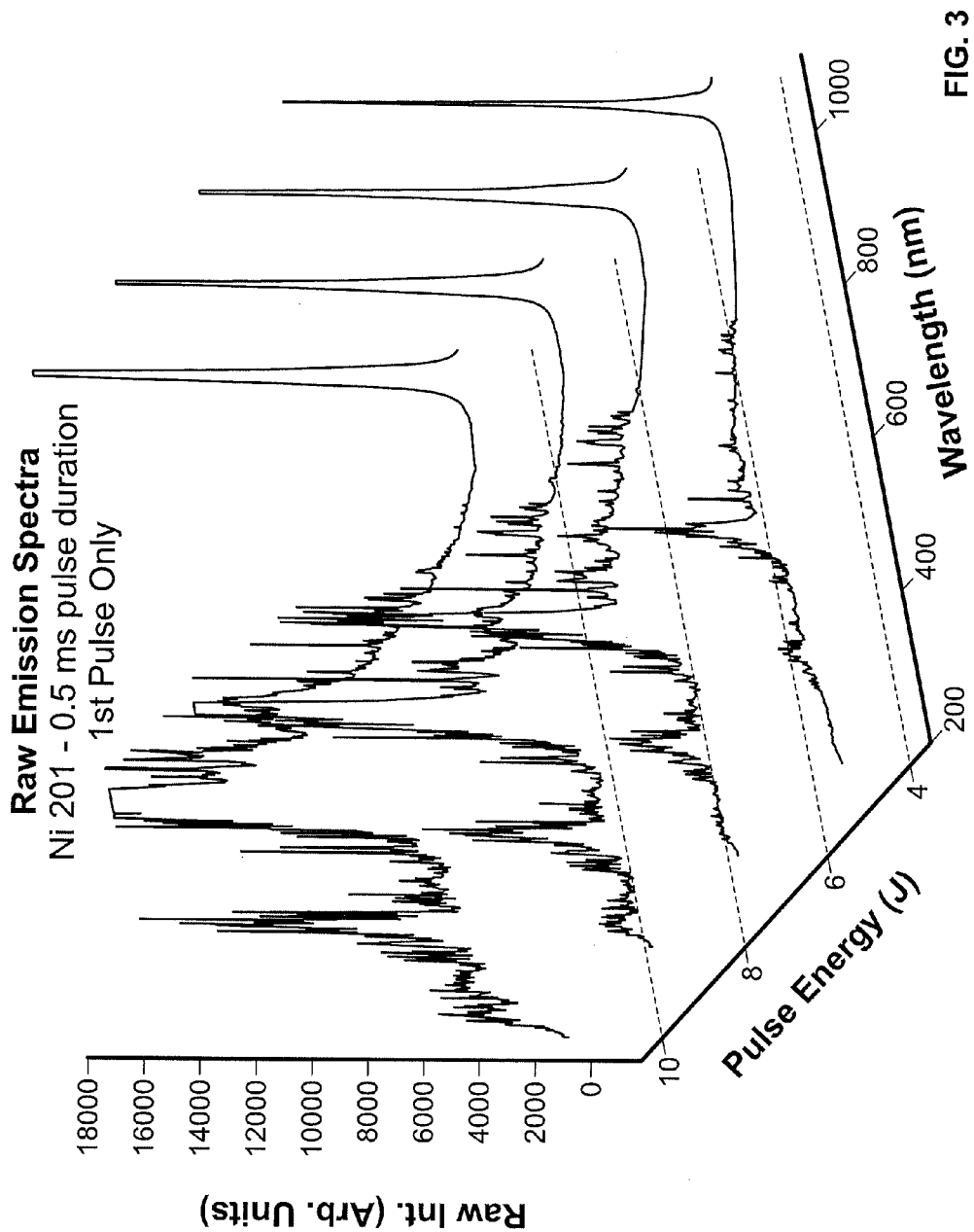
FIG. 3 is a plot of raw emission spectra over a range of pulse energies (first pulse only) for Nickel-201.

In an exemplary experimental setup according to the present disclosure, emitted light is collected by a collimating lens positioned just off the drilling axis and delivered by fiber optic cable to a portable USB-powered spectrometer. Data is generated in the form of wavelength vs. intensity spectra for each laser pulse—in real time—and contains information about elemental composition and relative energy level populations of electrons in the system, as well as the intensity of the reflected primary Nd:YAG laser beam. Because the detected emission spectra contain information about local laser-material interaction conditions and are collected in real-time, the collected information has significant value/use for process monitoring and control applications. Thus, as shown in FIGS. 1-3, raw emission spectra is effectively obtained for three (3) illustrative materials, namely Inconel 625—an austenitic nickel-chromium-based superalloy available from Special Metals Corporation (New Hartford, N.Y.) (FIG. 1), Inconel 718—a second nickel-chromium-based superalloy available from Special Metals Corporation (New Hartford, N.Y.) (FIG. 2), and Nickel 201 (FIG. 3).

Based on collection of raw emission spectra of the type depicted in FIGS. 1-3, the systems and methods of the present disclosure may be used for advantageous process monitoring and control, e.g., using ratios of emission intensities of specific constituents/elements associated with the materials (e.g., metals and/or ceramics) being processed/drilled. Thus, for example, it has been shown/determined that emission line intensities and ratios of line intensities are heavily dependent on the laser pulse parameters used for processing. It has also been shown/determined that certain final hole quality features are also a function of these same pulse parameters. It is believed that both of these relationships are due to local heating mechanisms within the workpiece material, and that the degree of vaporization that occurs during drilling increases as pulse energy increases and pulse duration increases. Regardless of the underlying mechanistic explanation, the noted relationships permit the disclosed systems and methods to effectuate process control based on spectroscopic data collection/capture and associated analytical operations, e.g., to ensure final hole quality.

Figure 4:
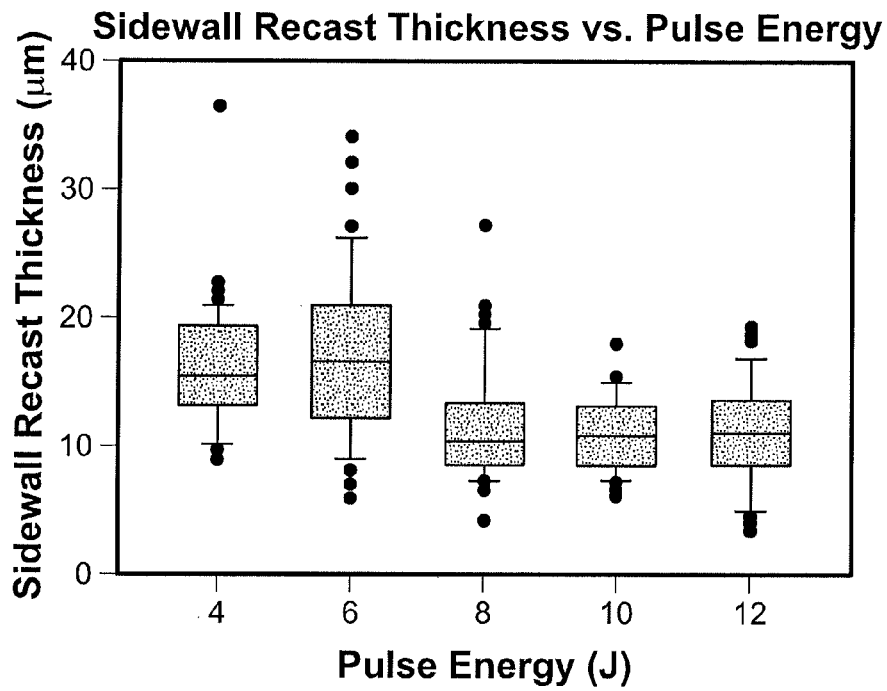
FIGS. 4-7 are plots demonstrating the relationship between laser pulse parameters and hole-related features/characteristics.
Figure 5:
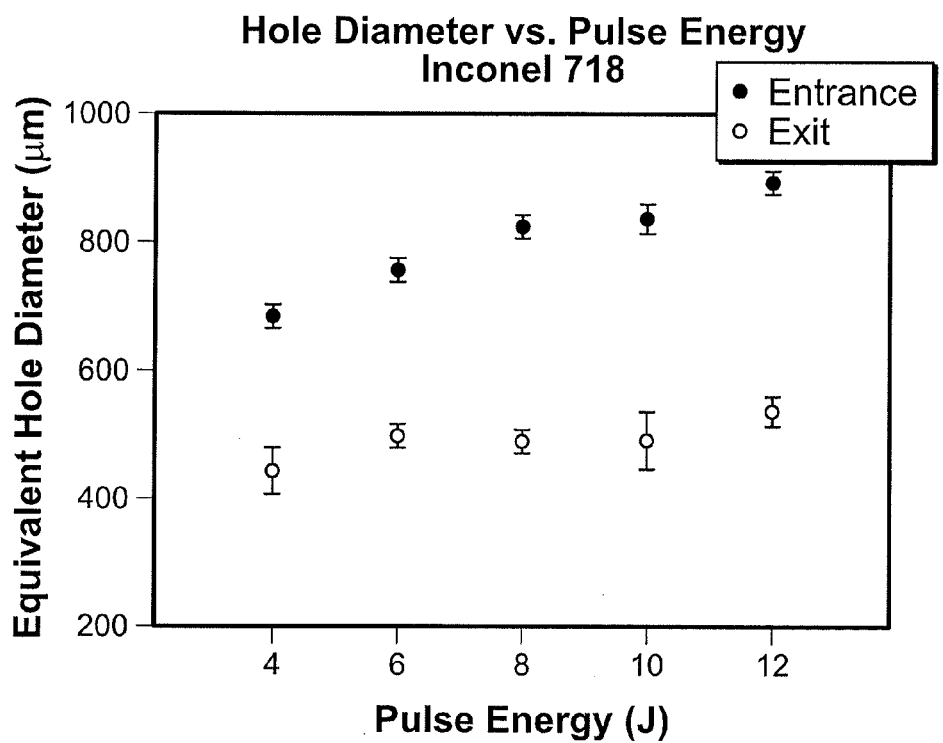
Figure 6:
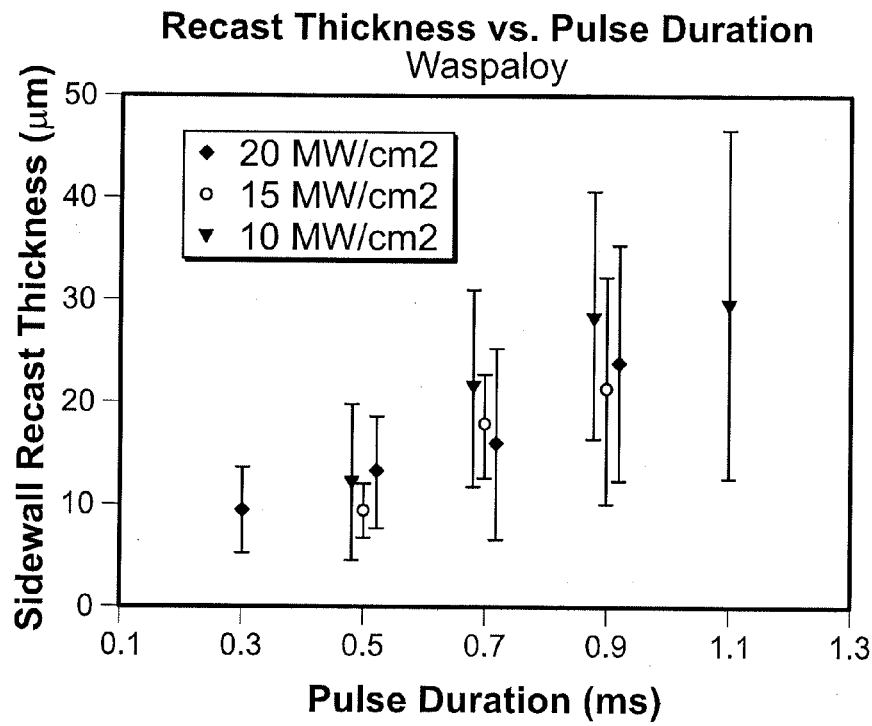
Figure 7:
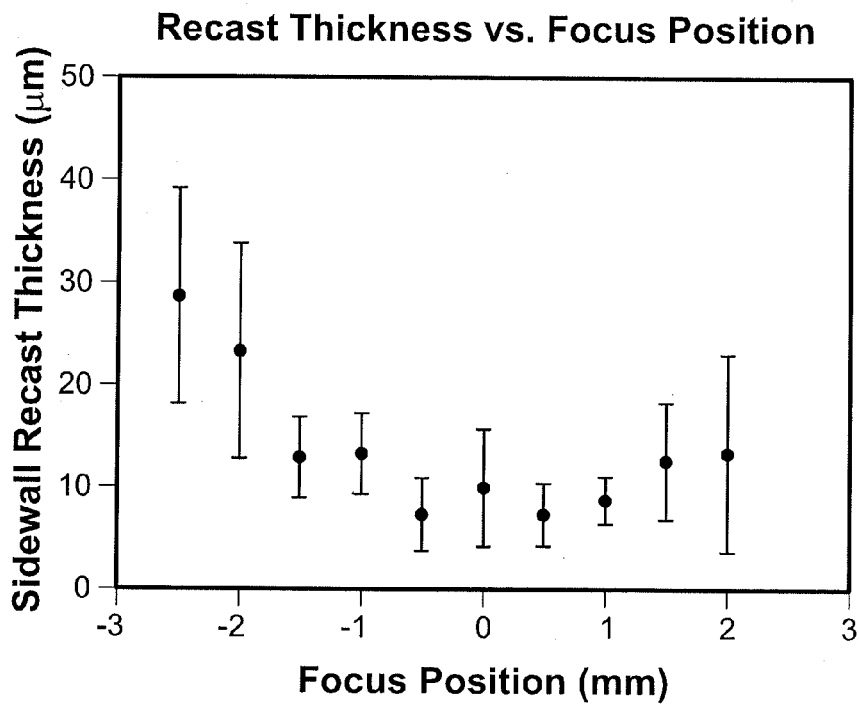

With reference to FIGS. 4-7, test data is provided that demonstrates—by way of illustration—the existence of correlations between hole features/characteristics and laser hole drilling parameters. Thus, for example, FIG. 4 illustrates the correlation between laser pulse energy and sidewall recast thickness. FIG. 5 illustrates the correlation between hole diameter and pulse energy (for Inconel 718). FIG. 6 illustrates the correlation between sidewall recast thickness and pulse duration (for Waspaloy). FIG. 7 illustrates the correlation between sidewall recast thickness and focus position of the laser drilling operation.

The test data included in FIGS. 4-7 is merely exemplary of correlations that exist in laser drilling operations and such test data provides a backdrop against which the systems and methods of the present disclosure operate. More particularly, as described in greater detail below, the disclosed systems and methods may function to monitor and/or control laser drilling operations so as to yield desired workpiece results by obtaining, evaluating, correlating and acting upon spectral emission data associated with the laser drilling operation.

For descriptive purposes, process control applications that are based on spectral ratios detected during laser drilling operations according to the present disclosure can be broken up into three categories according to the present disclosure: (a) coarse control, (b) fine control, and c) endpoint detection. However, the present disclosure is not limited by or to such descriptive breakdown.

a) Coarse Control:

Many factors can cause laser drilling conditions to become grossly detrimental. Specifically, poor workpiece fit-up leading to out-of-focus positioning and/or irregular flash-lamp degradation can have significant effects on drilled hole quality. Continuous monitoring for deviations from pre-defined spectral emission intensity ranges and/or for large changes in line intensity ratios based on spectral emission detection can identify such grossly detrimental conditions according to the present disclosure.

Figure 8:
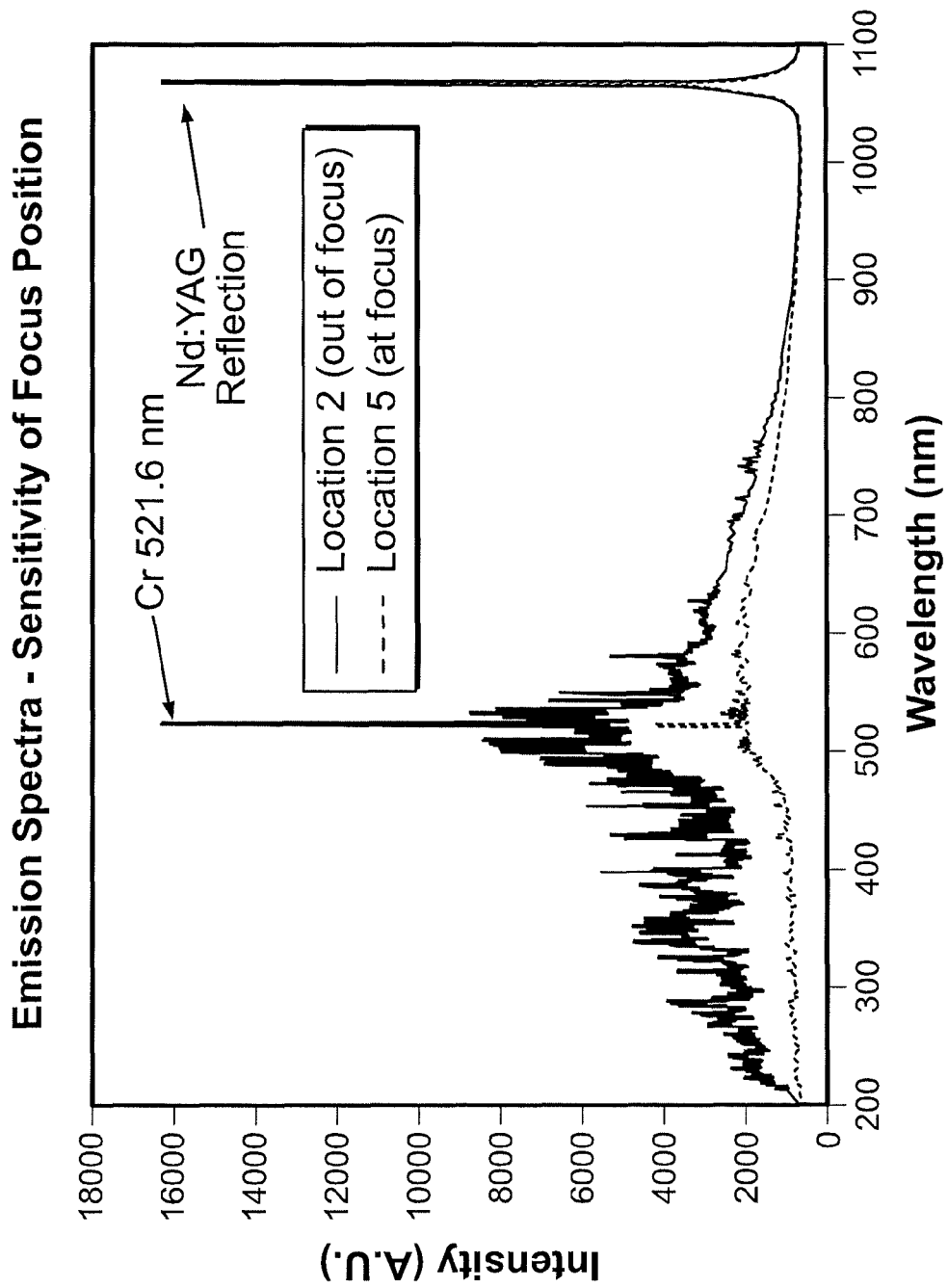
FIGS. 8-9 are plots showing the effect of focus position on recast thickness of an exemplary workpiece.
Figure 9:
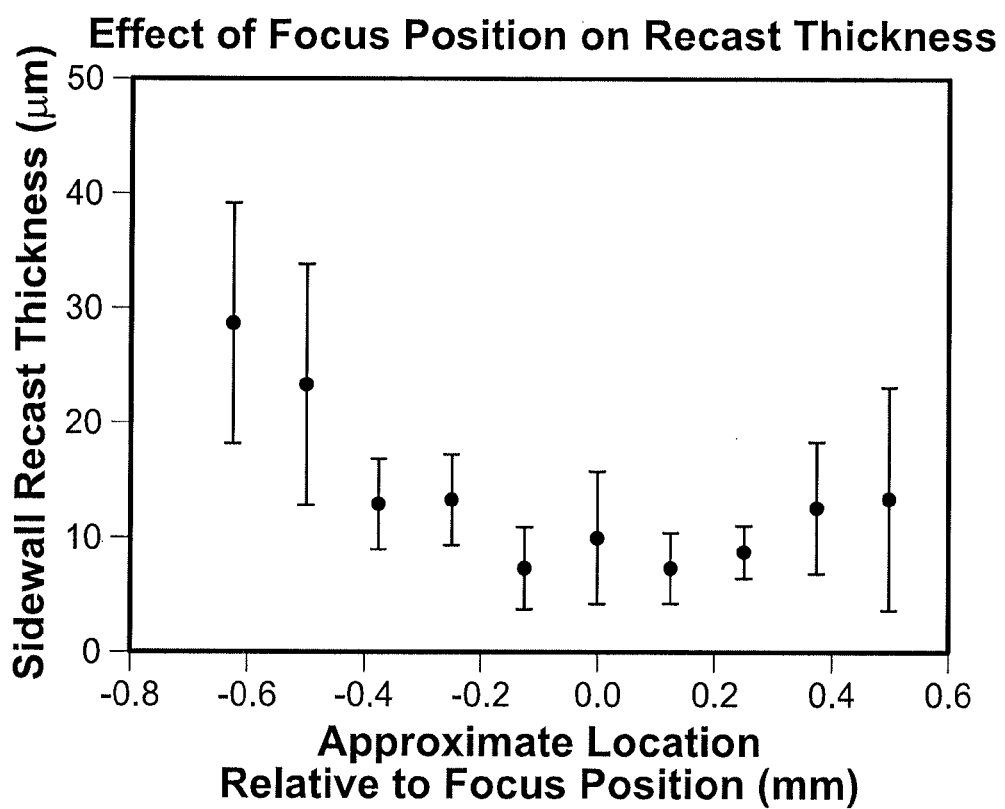

With reference to FIGS. 8-9, plots showing the effect of focus position on recast thickness are provided that demonstrates the sensitivity of grossly detrimental conditions. Thus, the plot of FIG. 8 shows emission spectra from a workpiece that is: (i) at focus (location 5; upper line plot), and (ii) approximately 1.5 mm out of focus (location 2; lower line plot). FIG. 9 shows recast thickness measurements for the same series of holes. The relevant holes are shown in FIG. 10.

Figure 10:
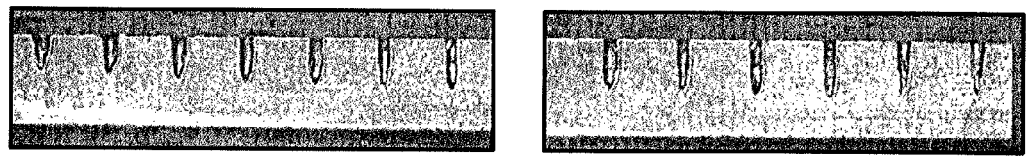
FIG. 10 is an image showing holes formed in an exemplary workpiece.

As is readily apparent from the exemplary information set forth in FIGS. 8-10, the systems and methods of the present application can be implemented, at least in part, by establishing predetermined criteria for identifying laser processing systems that are in need of coarse control. For example, logic criteria can be implemented such that emission spectra that deviate from a predetermined value and/or range by a certain amount and/or percentage give rise to a control signal being delivered to the laser drilling system to initiate appropriate corrective action. For example, the control signal could give rise to an alarm signal, a suspension of laser drilling operations, a modification in laser drilling parameters, a repositioning of the workpiece relative to the source of the laser pulse, and combinations thereof. The predetermined criteria (e.g., emission spectra values, emission spectra ratios and/or ranges associated therewith) may be advantageously stored in computer memory for access and use in determining the need for control actions (if any) according to the present disclosure.

b) Fine Control

Figure 11:
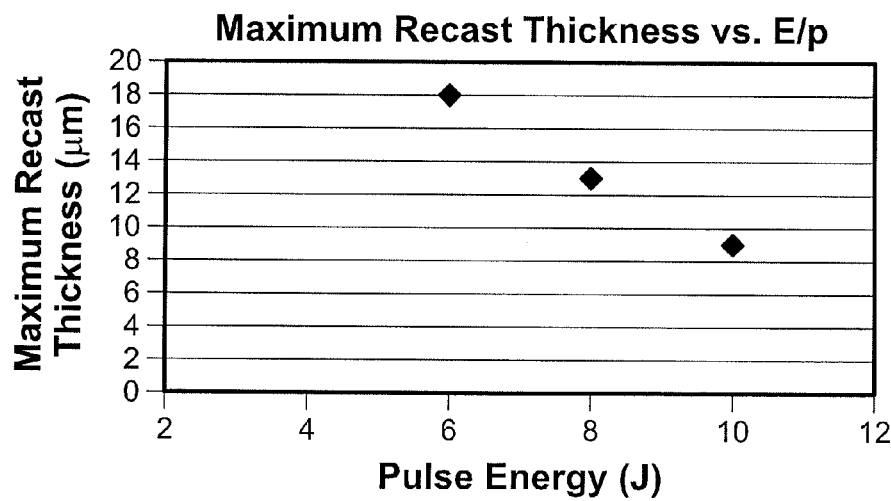
FIG. 11 is a plot showing the relationship between recast thickness and pulse energy for an exemplary workpiece.
Figure 12:
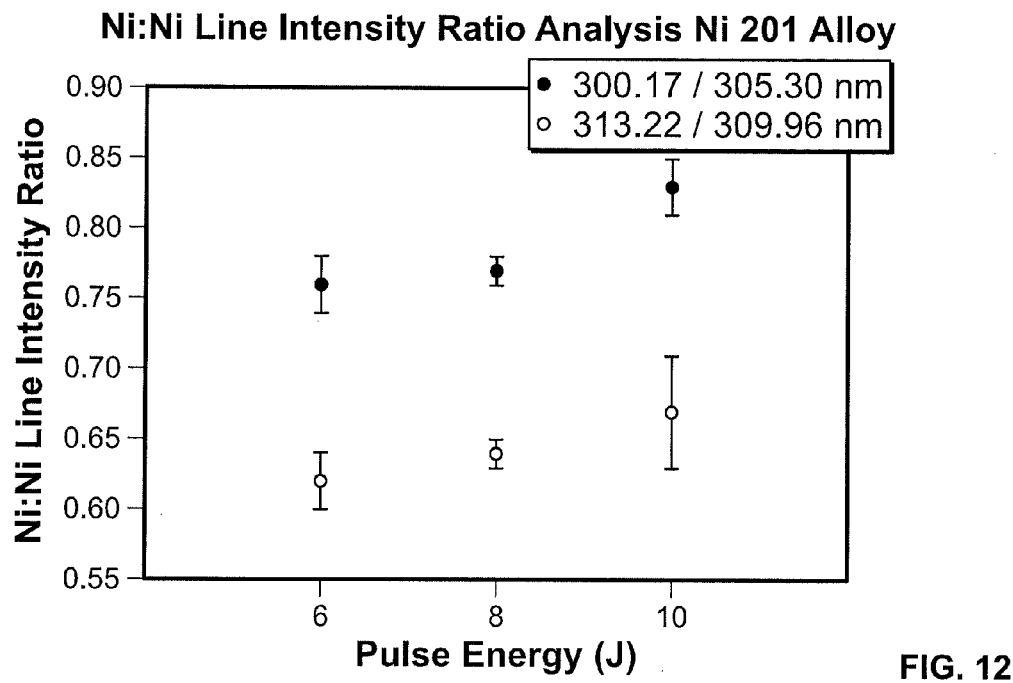
FIGS. 12 and 13 are plots showing the relationship between pulse energy and line intensity ratio according to the present disclosure.
Figure 13:
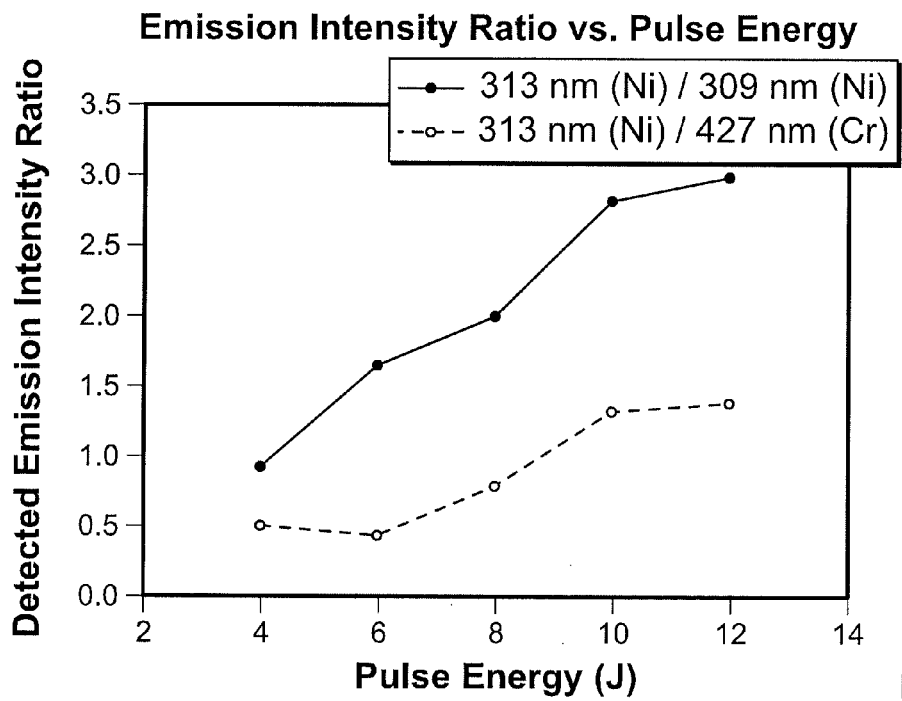
Figure 14:
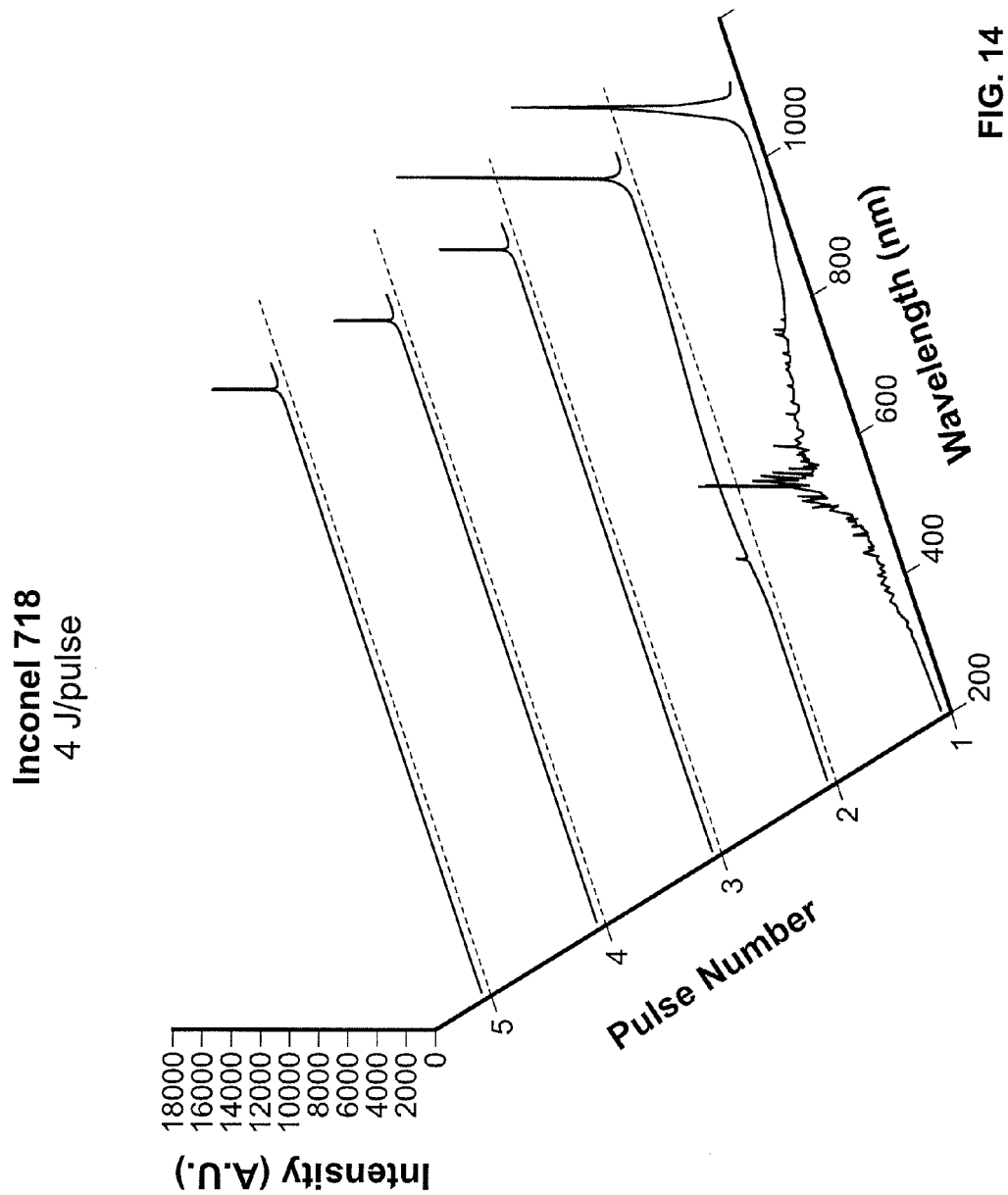
FIGS. 14-19 are plots showing emission spectra vs. pulse number for Inconel 718 according to the present disclosure.
Figure 15:
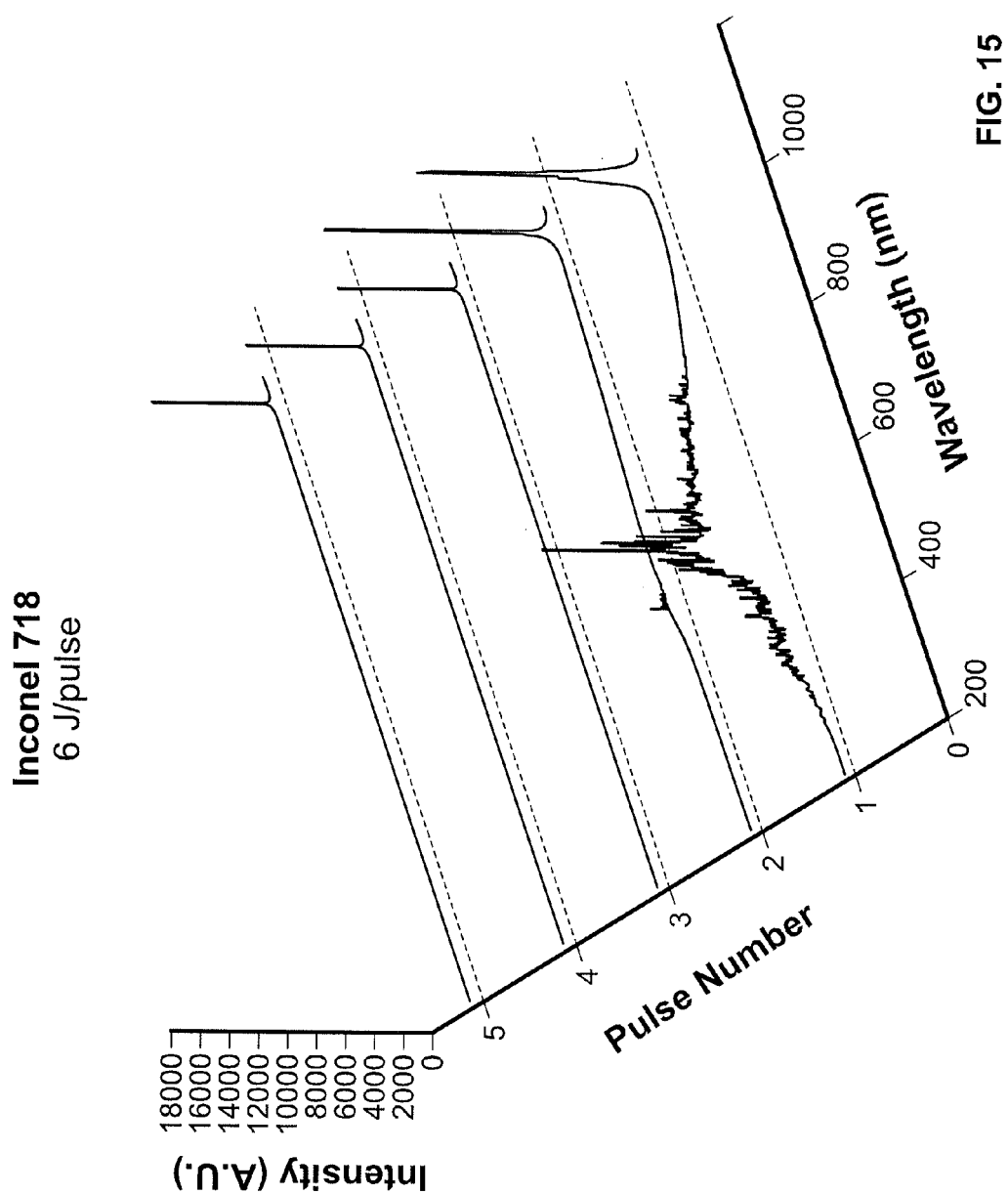
Figure 16:
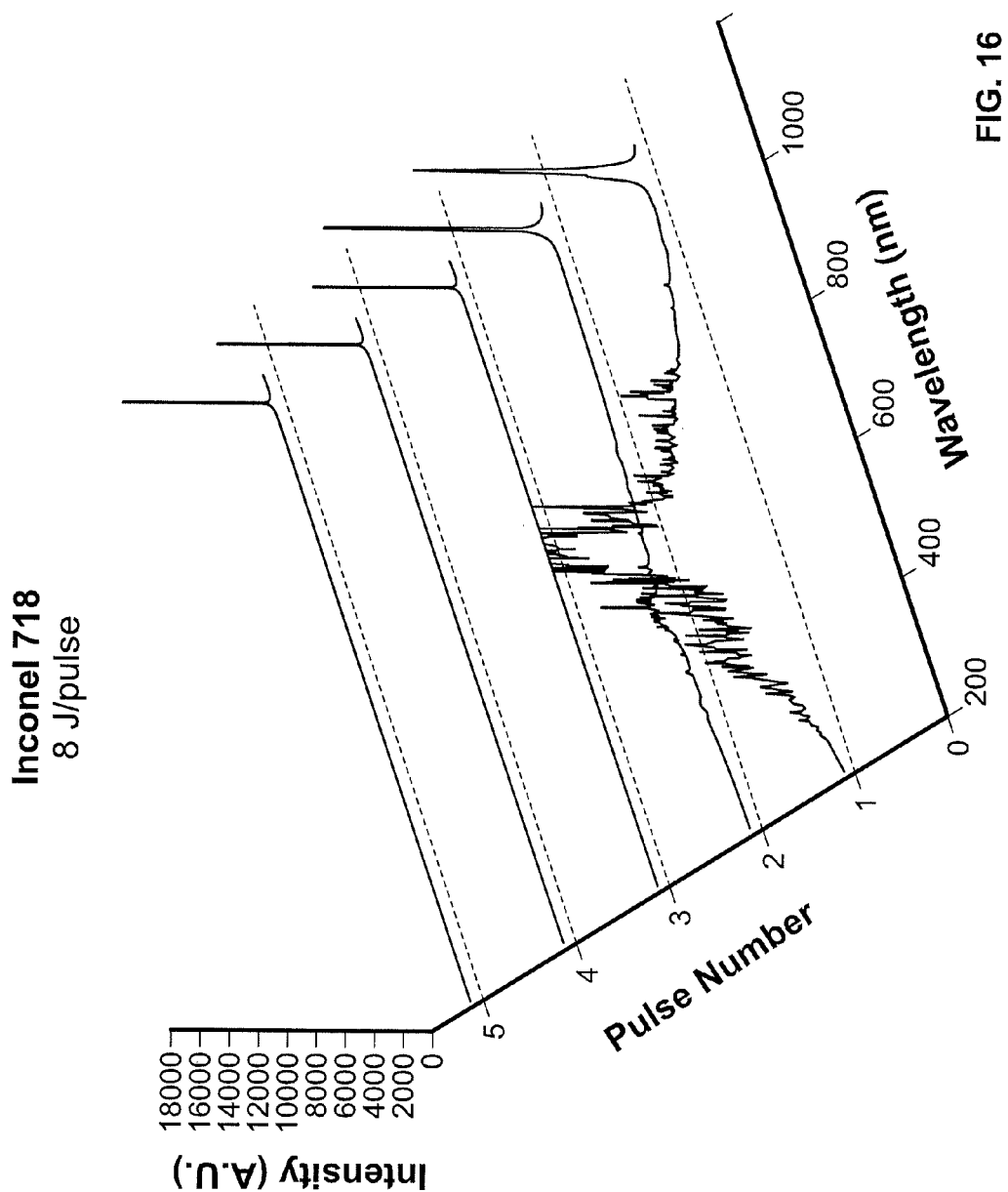
Figure 17:
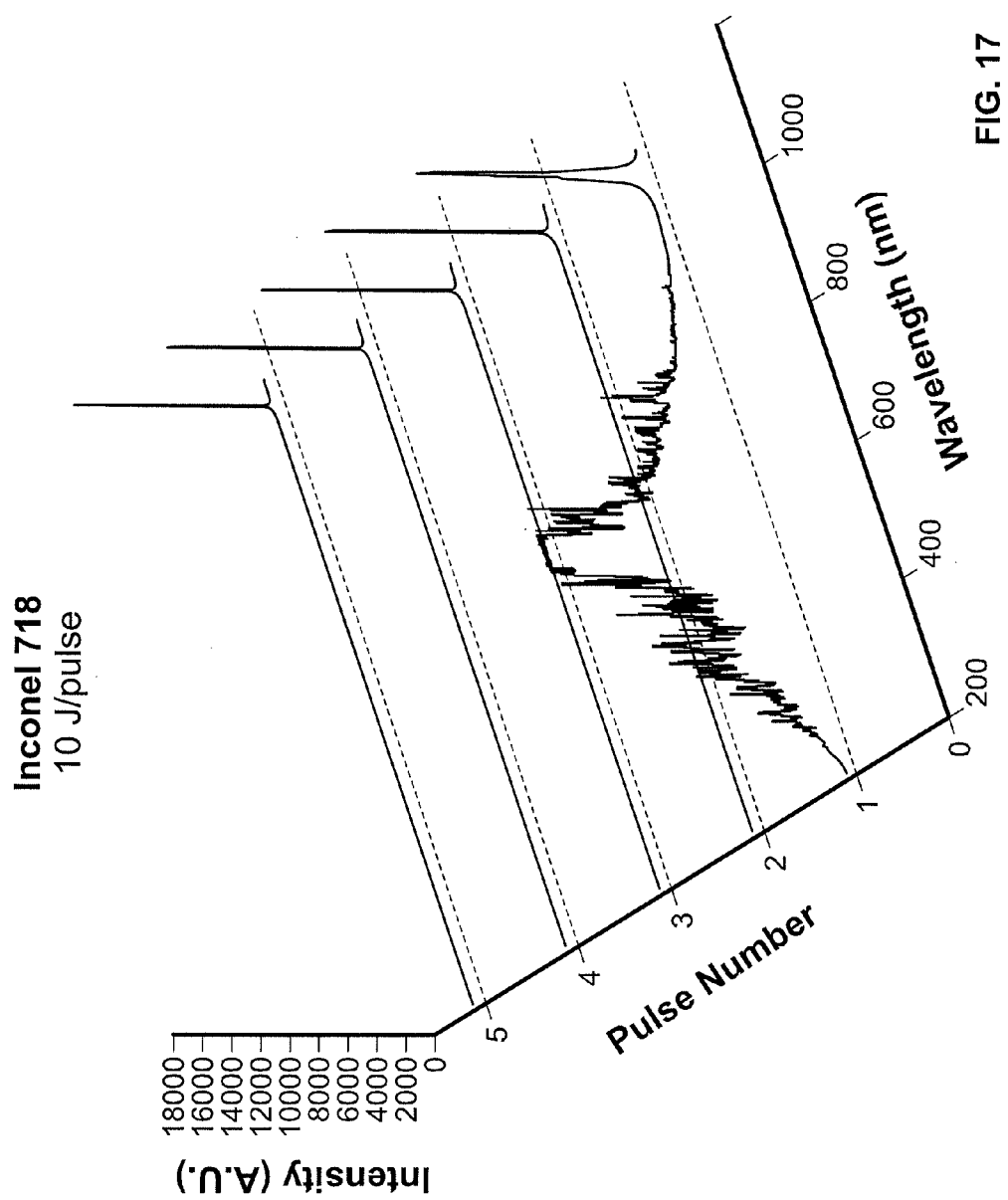
Figure 18:
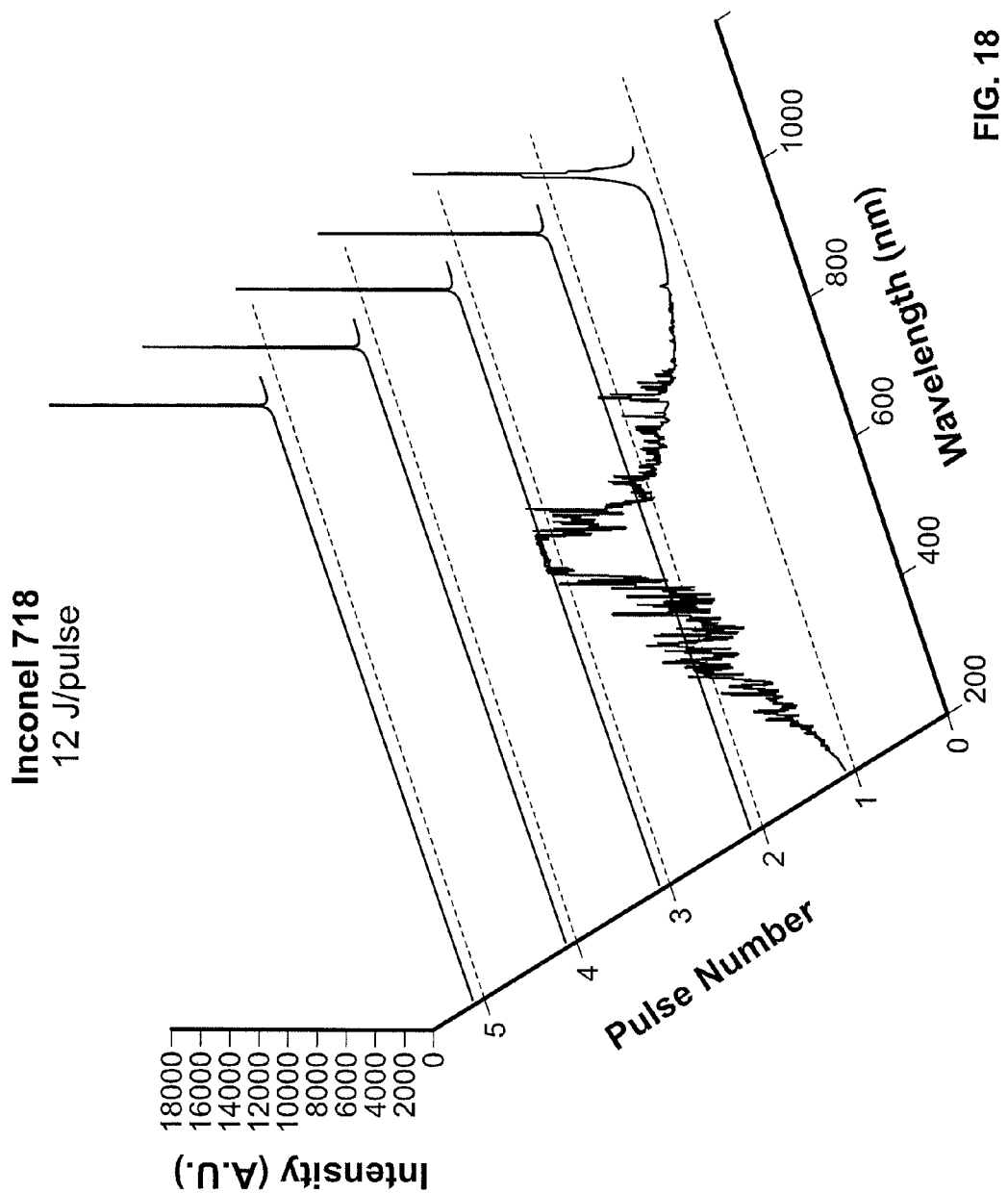

Small changes in laser pulse parameters and combinations thereof have also been shown to have a significant effect on the amount of residual re-solidified material that remains within a hole (see, e.g., FIG. 11). Because detected emission line intensities are also sensitive to these small changes in pulse parameters (see, e.g., FIGS. 12 and 13), the ability to monitor small changes in selected intensity ratios according to the present disclosure can allow for appropriate/desirable compensation of pulse parameters in a timely fashion to ensure material is being drilled under proper local conditions. Indeed, the systems and methods can advantageously function to monitor small changes in selected intensity rations so as to identify when a laser drilling process is out of tolerance and initiate/facilitate appropriate correction/compensation of pulse parameters in order to ensure that desired hole drilling parameters are achieved.

Similar to the coarse control operations described above, the systems and methods of the present application can be implemented, at least in part, by establishing predetermined criteria for identifying laser processing systems that are in need of fine control. For example, logic criteria can be implemented such that emission spectra that deviate from a predetermined value and/or range by a certain amount or percentage give rise to a control signal being delivered to the laser drilling system to initiate appropriate corrective action. For example, the control signal could give rise to an alarm signal, a suspension of laser drilling operations, a modification in laser drilling parameters, a repositioning of the workpiece relative to the source of the laser pulse, and combinations thereof. The predetermined criteria (e.g., emission spectra values, emission spectra ratios and/or ranges associated therewith) may be advantageously stored in computer memory for access and use in determining the need for control actions (if any) according to the present disclosure.

c) Endpoint Detection

Detection of hole completion has also been demonstrated using the systems and methods of the present disclosure, e.g., based on specific ratios of line intensities. Thus, in an exemplary embodiment of the present disclosure, the ratio of a specific constituent/element to the reflected Nd:YAG beam at 1064 nm may be used to monitor/identify hole completion (see, e.g., FIGS. 14-18). The ability to precisely monitor for hole completion according to the present disclosure provides important processing advantages, e.g., reducing/eliminating unnecessary laser pulses which otherwise could reduce manufacturing efficiency and/or increase thermal or mechanical damage to the component material.

Figure 19:
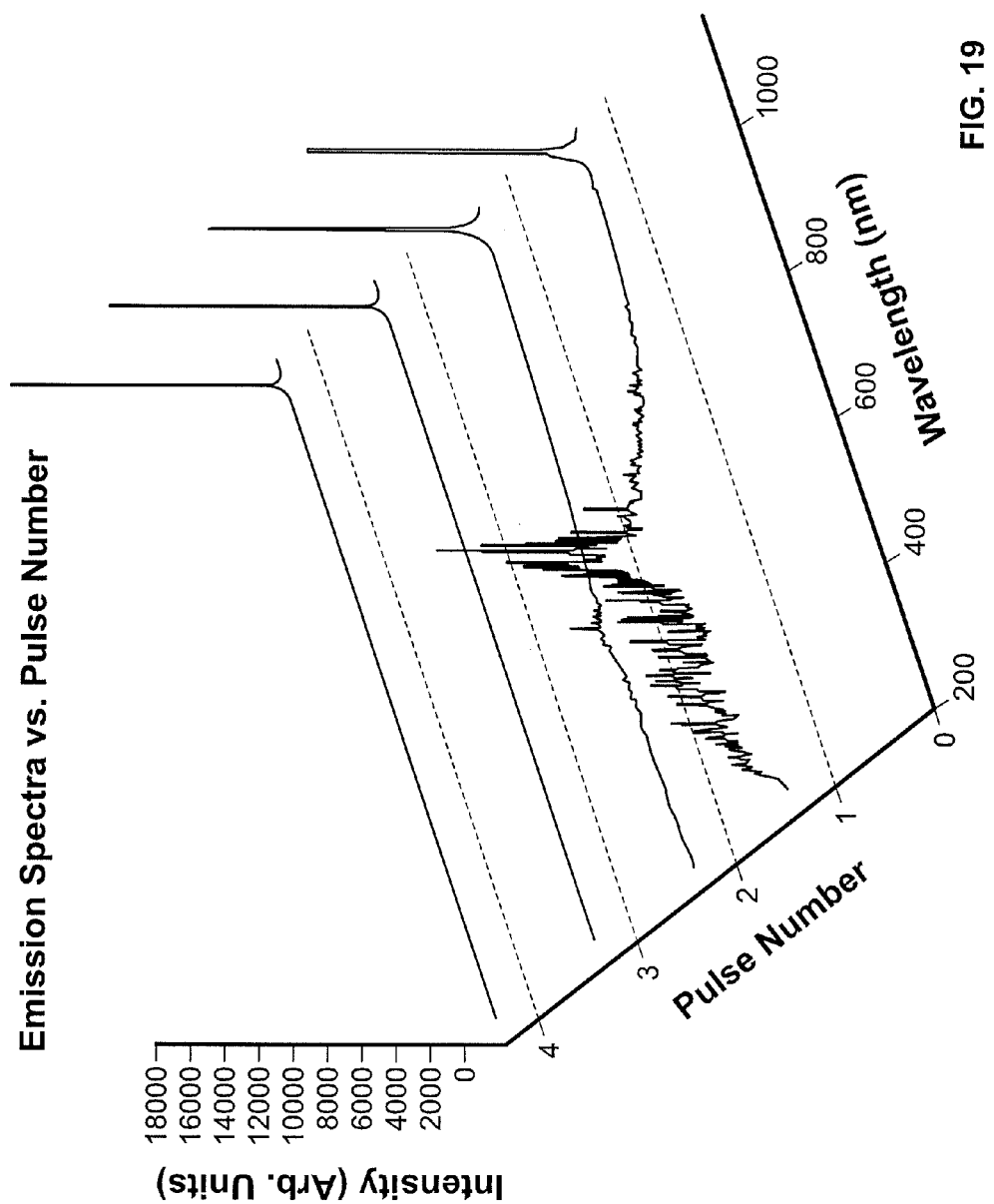
Figure 20:
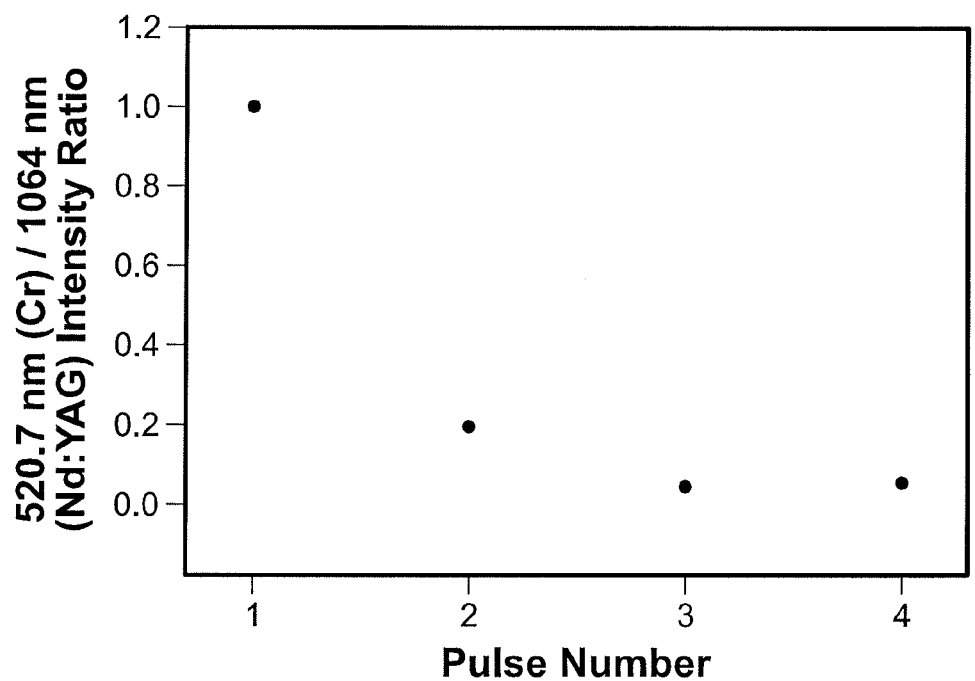
FIGS. 20 and 21 is a plot and an image, respectively, showing the endpoint detection functionality according to an exemplary embodiment of the present disclosure.
Figure 21:
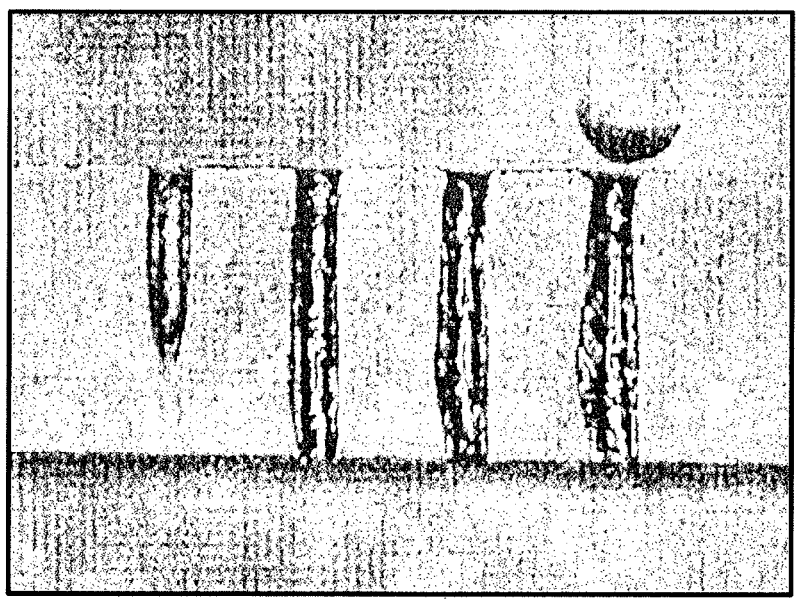

FIGS. 19-21 show exemplary data related to a completed laser-drilled hole, where breakthrough occurred during the second laser pulse. In particular, FIG. 19 shows general emission behavior, FIG. 20 shows an exemplary 520 nm Cr-to-primary beam reflection ratio, and FIG. 21 provides a photographic image that confirms breakthrough occurring on the second laser pulse. Thus, the photographic image confirms the utility of the spectral emission data as an indicator of hole breakthrough according to the present disclosure. Reference information for analytic purposes may be stored in computer memory and accessed, as needed, to determined hole breakthrough according to the present disclosure, and to communicate/implement appropriate control action(s) to the laser drilling system.

d) Process Monitoring/Control Using Calculated Electron Temperatures of Constituents/Elements As noted herein, spectral emission occurs at specific wavelengths depending on the specific constituent(s)/element(s) involved, while the peak intensity is determined by the population density of discrete energy levels of these constituents/elements. According to the present disclosure, a Boltzmann Plot method may be used that utilizes these peak intensities along with known coefficients associated with each energy level transition to determine the local electron temperature, which is defined by the negative inverse of the calculated slope. Because the electron temperature value is associated with the local laser-material interaction conditions, the calculated local electron temperature may be used to drive desirable laser drilling process controls according to the present disclosure. Again, for descriptive purposes, control operations according to the disclosed systems and methods may be referenced as (i) coarse, (ii) fine, and (iii) endpoint detection operations.

i. Coarse

Figure 22:
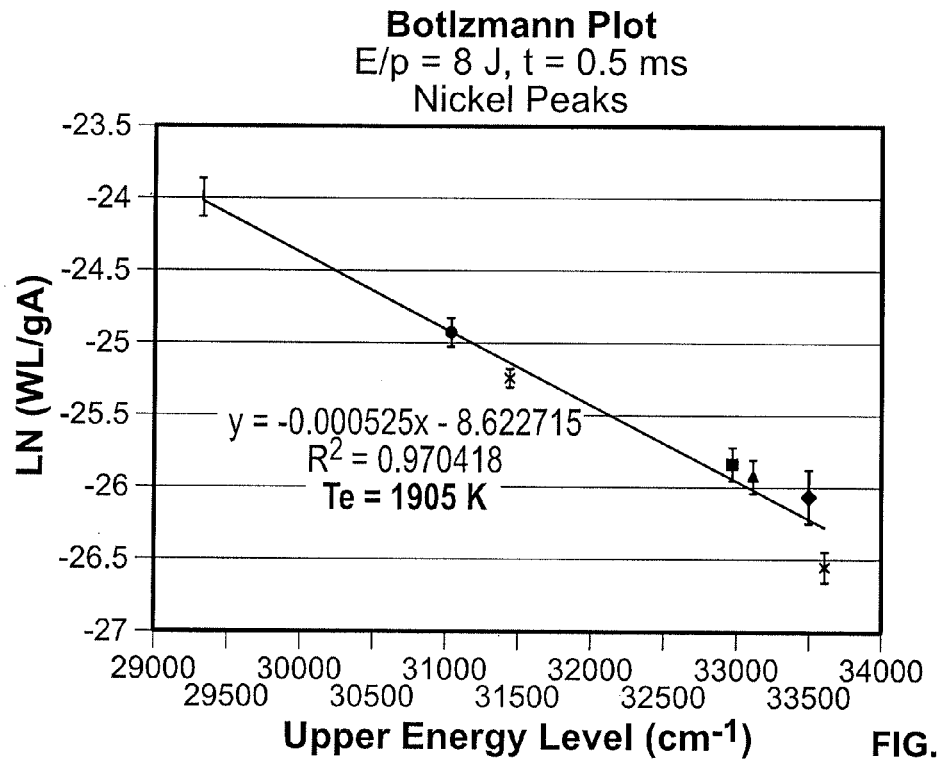
FIG. 22 is an exemplary Boltzmann Plot showing electron temperature according to the present disclosure.
Figure 23:
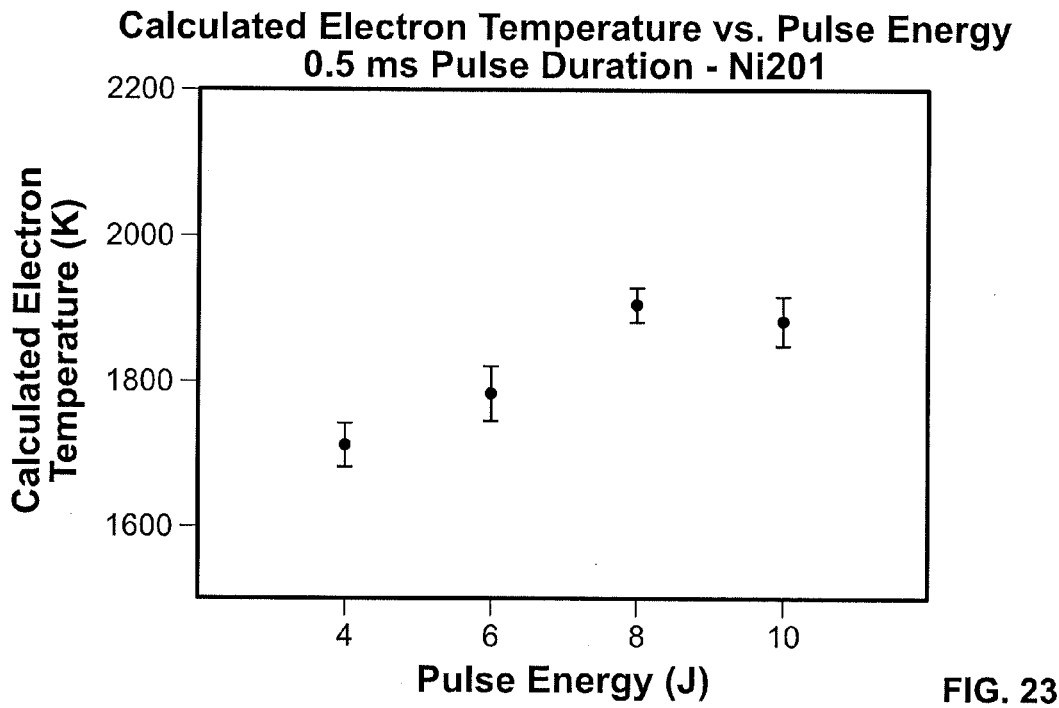
FIG. 23 is an exemplary plot of calculated electron temperature vs. pulse energy according to the present disclosure.

Large changes in calculated electron temperatures can identify grossly detrimental conditions. FIG. 22 shows An exemplary Boltzmann Plot with a slope representing an electron temperature of 1905° K. A large change in slope due to large changes in processing conditions, such as poor part fit-up or premature flash-lamp degradation, may be used according to the disclosed systems/methods to identify such adverse conditions in real time and to permit prompt corrective action to be undertaken.

ii. Fine

Because the calculated electron may be sensitive to local laser-material interaction conditions, monitoring for small changes in electron temperature according to the present disclosure can advantageously allow for appropriate compensation in laser parameters in order to maintain proper processing conditions.

iii. Endpoint Detection

Electron temperatures values can be constantly monitored according to the present disclosure for large changes in slope, indicating hole completion.

It is explicitly contemplated that the systems and methods presented herein may be carried out, e.g., via one or more programmable processing units having associated therewith executable instructions held on one or more computer readable medium, RAM, ROM, hard drive and/or hardware for solving for, deriving and/or applying the analytical and/or control functions as taught herein. In exemplary embodiments, the hardware, firmware and/or executable code may be provided, e.g., as upgrade module(s) for use in conjunction with existing infrastructure (e.g., existing devices/processing units). Hardware may, e.g., include components and/or logic circuitry for executing the embodiments taught herein as a computing process.

Displays and/or other feedback means may also be included to convey detected/processed data. Thus, in exemplary embodiments, detected information/data and/or analytical results may be displayed, e.g., on a monitor. The display and/or other feedback means may be stand-alone or may be included as one or more components/modules of the processing unit(s).

The actual software code or control hardware which may be used to implement some of the present embodiments is not intended to limit the scope of such embodiments. For example, certain aspects of the embodiments described herein may be implemented in code using any suitable programming language type such as, for example, C or C++ using, for example, conventional or object-oriented programming techniques. Such code is stored or held on any type of suitable computer-readable medium or media such as, for example, a magnetic or optical storage medium.

As used herein, a "processor," "processing unit," "computer" or "computer system" may be, for example, a wireless or wireline variety of a microcomputer, minicomputer, server, mainframe, laptop, personal data assistant (PDA), wireless e-mail device (e.g., "BlackBerry" trade-designated devices), cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include storage medium for storing software, including a hard disk, an optical disk, floppy disk, ROM (read only memory), RAM (random access memory), PROM (programmable ROM), EEPROM (electrically erasable PROM), etc.

Figure 24:
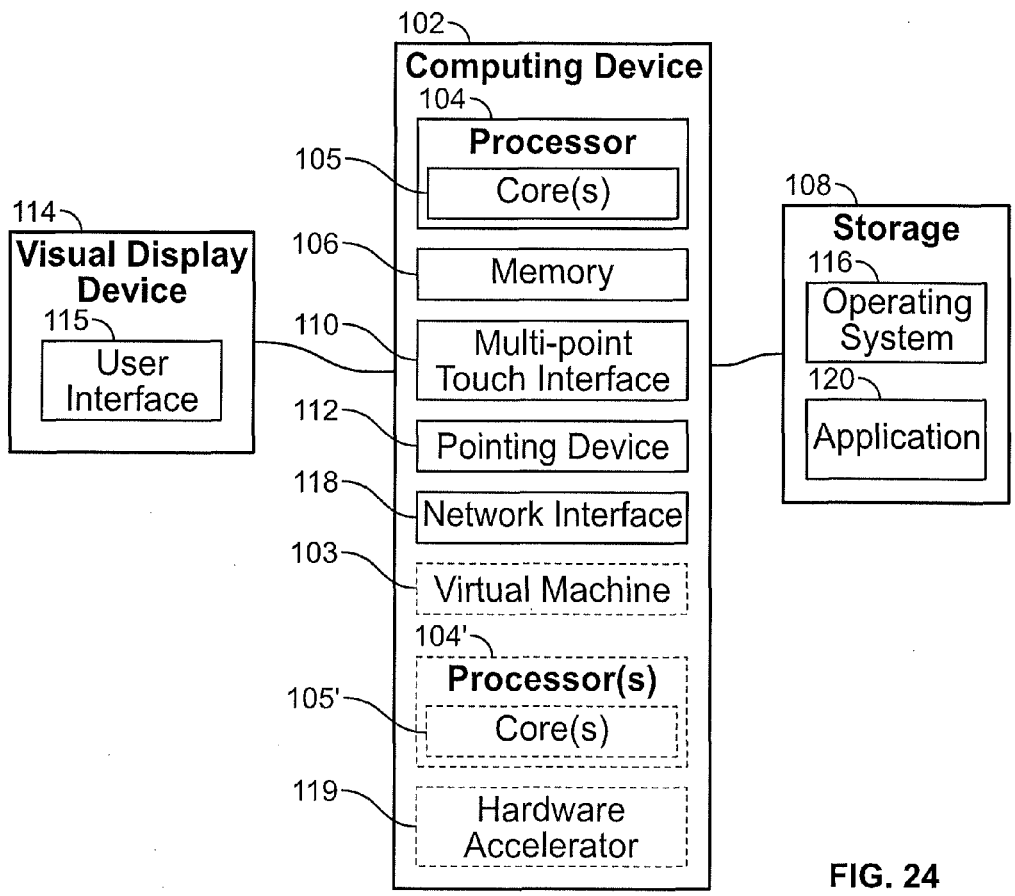
FIG. 24 depicts a blockflow diagram of an exemplary computing environment suitable for monitoring/controlling laser drilling processes and/or operations as taught herein.

Referring now to FIG. 24, an exemplary computing environment suitable for practicing exemplary embodiments is depicted. The environment may include a computing device 102 which includes one or more media for storing one or more computer-executable instructions or code for implementing exemplary embodiments. For example, memory 106 included in the computing device 102 may store computer-executable instructions or software, e.g. instructions for implementing and processing every module of the application 120.

The computing device 102 also includes processor 104 and one or more processor(s) 104' for executing software stored in the memory 106, and other programs for controlling system hardware. Processor 104 and processor(s) 104' each can be a single core processor or multiple core (105 and 105') processor. Virtualization can be employed in computing device 102 so that infrastructure and resources in the computing device can be shared dynamically. Virtualized processors may also be used with application 120 and other software in storage 108. A virtual machine 103 can be provided to handle a process running on multiple processors so that the process appears to be using only one computing resource rather than multiple. Multiple virtual machines can also be used with one processor. Other computing resources, such as field-programmable gate arrays (FPGA), application specific integrated circuit (ASIC), digital signal processor (DSP), Graphics Processing Unit (GPU), and general-purpose processor (GPP), may also be used for executing code and/or software. A hardware accelerator 119, such as implemented in an ASIC, FPGA, or the like, can additionally be used to speed up the general processing rate of the computing device 102.

The memory 106 may comprise a computer system memory or random access memory, such as DRAM, SRAM, EDO RAM, etc. The memory 106 may comprise other types of memory as well, or combinations thereof. A user may interact with the computing device 102 through a visual display device 114, such as a computer monitor, which may display one or more user interfaces 115. The visual display device 114 may also display other aspects or elements of exemplary embodiments, e.g., databases, ranking results, etc. The computing device 102 may include other I/O devices such as a keyboard or a multi-point touch interface 110 and a pointing device 112, for example a mouse, for receiving input from a user. The keyboard 110 and the pointing device 112 may be connected to the visual display device 114. The computing device 102 may include other suitable conventional I/O peripherals. The computing device 102 may further comprise a storage device 108, such as a hard-drive, CD-ROM, or other storage medium for storing an operating system 116 and other programs, e.g., a program 120 including computer executable instructions solving for, deriving, and/or applying the analytical and/or control functions, as taught herein.

The computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The computing device 102 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Figure 25:
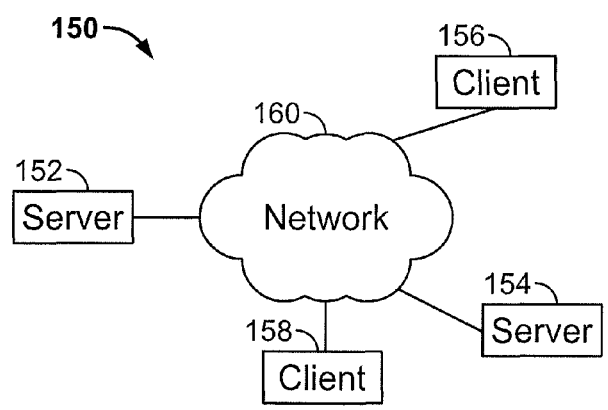
FIG. 25 depicts an exemplary network environment suitable for a distributed implementation of the embodiments taught herein.

FIG. 25 illustrates an exemplary network environment 150 suitable for a distributed implementation of exemplary embodiments. The network environment 150 may include one or more servers 152 and 154 coupled to clients 156 and 158 via a communication network 160. In one implementation, the servers 152 and 154 and/or the clients 156 and/or 158 may be implemented via the computing device 102. The network interface 118 of the computing device 102 enables the servers 152 and 154 to communicate with the clients 156 and 158 through the communication network 160. The communication network 160 may include Internet, intranet, LAN (Local Area Network), WAN (Wide Area Network), MAN (Metropolitan Area Network), wireless network (e.g., using IEEE 802.11 or Bluetooth), etc. In addition the network may use middleware, such as CORBA (Common Object Request Broker Architecture) or DCOM (Distributed Component Object Model) to allow a computing device on the network 160 to communicate directly with another computing device that is connected to the network 160.

In the network environment 160, the servers 152 and 154 may provide the clients 156 and 158 with software components or products under a particular condition, such as a license agreement. The software components or products may include one or more components of the application 120. For example, the client 156 may perform analytical functions as described herein, the results of which may be used to identify/determine control operations which may be communicated by way of server 152 for processing and implementation by or within a laser drilling system.

* * * * * * * * * *

Thus, the systems and methods of the present disclosure offer substantial benefits to laser drilling processes, including the following specific advantages:
1. The ability to detect and monitor the character of material by emission spectroscopy during industrial laser-drilling.
    a. The character of material during drilling (i.e., energy level populations) has been shown to be indicative of local conditions (e.g., vaporization). These local drilling conditions have also been shown to have a significant impact on hole quality.
    b. Continuous monitoring will identify when the drilling process has gone out of pre-determined nominal conditions and, according to the disclosed systems and methods, enables implementation of a feedback mechanism to restore appropriate local conditions.
2. Endpoint confirmation, or breakthrough detection, based on a signal from (i) reflection of the drilling laser, and/or (ii) workpiece emission from the same detection area. According to the systems and methods of the present disclosure, endpoint confirmation may be advantageously employed to identify breakthrough and/or to limit unnecessary laser pulses, thereby increasing manufacturing efficiency and reducing the potential for thermal and/or mechanical damage to nearby component material.

While the invention has been described with reference to preferred embodiments, it will be understood by those skilled in the art that various changes may be made and equivalents may be substituted for the elements thereof without departing from the scope of the invention. In addition, many modifications may be made to adapt the teaching of the invention to a particular workpiece, material, alloy, product, device, process, process equipment, process control software, method, or application area, without departing from the essential scope thereof. Therefore, it is intended that the invention not be limited to the particular embodiments and best mode contemplated for carrying out this invention as described herein.

What is claimed is:
1. A method of controlling at least one aspect of a laser drilling process, wherein the method comprises:
    detection of atomic emission spectra associated with one or more constituents of vapor/plasma generated during laser drilling of a workpiece;
    analyzing the atomic emission spectra of the one or more constituents present in the vapor/plasma relative to pre-determined criteria; and
    controlling at least one aspect of the laser drilling process based on the analysis of the atomic emission spectra relative.
2. The method of claim 1, wherein the detection of atomic emission spectra is conducted using atomic emission spectroscopy.
3. The method of claim 1, wherein the analysis step comprises calculation of electron temperature.

4. The method of claim 3, wherein the analysis includes correlating the calculated electron temperature with predetermined criteria associated with hole quality of the workpiece.

5. The method of claim 1, wherein the analysis includes determination of one or more spectra intensity ratios and correlating the one or more intensity ratios with predetermined criteria associated with drilled hole quality.

6. The method of claim 1, wherein the analysis is effective to identify breakthrough of a drilled hole in the workpiece.

7. The method of claim 6, wherein breakthrough is identified based on one or more of the following parameters:
   (a) breakthrough is determined when the spectral emission from a specific constituent falls below a predetermined value; or
   (b) breakthrough is determined when the ratio of the spectral emission of a specific constituent to the signal at a 1.06 μm wavelength is below a predetermined level.

8. The method of claim 1, wherein the analysis is effective in detecting when the laser drilling process is out of tolerance by utilizing one or more of the following steps:
   (a) detecting when the atomic emission spectra associated with a specific constituent is not within a specific predetermined range;
   (b) detecting when at least one ratio of atomic emission spectra associated with one or more specific constituents is not within a predetermined range;
   (c) detecting when the ratio of the atomic emission spectra associated with one or more specific constituents to a signal at 1.06 μm wavelength is not within a predetermined range; or
   (d) detecting when the electron temperature, calculated from spectral line intensities associated with the atomic emission spectra, is not within a predetermined range.

9. The method of claim 1, wherein the analysis is based on one or more of the following parameters: emission wavelength, emission line intensity, ratio of line intensities, and ratio of line intensities to the intensity of a primary beam reflection at 1.06 μm.

10. The method of claim 1, wherein the laser drilling process utilizes a high energy pulsed laser.

11. The method of claim 1, wherein the workpiece is fabricated from a metal, a ceramic or a combination thereof.

12. The method of claim 11, wherein the metal is an alloy material suitable for use in manufacturing high-temperature engine components.

13. The method of claim 1, wherein the control of at least one aspect of the laser drilling process is effectuated by a computer-based control system.

14. The method of claim 1, wherein the analysis is performed by a computer system that is programmed to perform the analysis of the atomic emission spectra of the one or more constituents relative to predetermined criteria that are stored in memory associated with said computer system.

15. A control system for controlling at least one aspect of a laser drilling system, wherein the control system comprises:
   means of detection of atomic emission spectra associated with one or more constituents present in vapor/plasma generated during laser drilling of a workpiece;
   means for analysis of the atomic emission spectra of the one or more constituents relative to predetermined criteria; and
   means for controlling at least one aspect of the laser drilling system based on the analysis of the atomic emission spectra.

16. The control system of claim 15, wherein the means for detection is an atomic emission spectroscopy apparatus.

17. The system of claim 15, wherein the means for analysis is a computer system that is programmed to perform the analysis of the atomic emission spectra of the one or more constituents relative to predetermined criteria that are stored in memory associated with said computer system.

18. The system of claim 15, wherein the means for controlling at least one aspect of the laser drilling system is a computer-based control system in communication with the laser drilling system.

* * * * *